United States Patent
Rouyre

(10) Patent No.: US 7,178,759 B2
(45) Date of Patent: Feb. 20, 2007

(54) HINGED DOOR FOR AIRCRAFT LANDING GEAR

(75) Inventor: François Rouyre, Cornebarrieu (FR)

(73) Assignee: Airbus France, Toulouse (FR)

( * ) Notice: Subject to any disclaimer, the term of this patent is extended or adjusted under 35 U.S.C. 154(b) by 0 days.

(21) Appl. No.: 11/048,801

(22) Filed: Feb. 3, 2005

(65) Prior Publication Data

US 2005/0211849 A1    Sep. 29, 2005

(30) Foreign Application Priority Data

Feb. 13, 2004   (FR) .................. 04 50261

(51) Int. Cl.
 *B64C 1/14*   (2006.01)
 *B64C 25/10*   (2006.01)

(52) U.S. Cl. .............................. 244/129.5; 244/102 A; 244/100 R

(58) Field of Classification Search ............ 244/102 R, 244/102 A, 100 R, 129.4, 129.1, 129.5; 49/141
See application file for complete search history.

(56) References Cited

U.S. PATENT DOCUMENTS

| | | | |
|---|---|---|---|
| 2,388,365 A * | 11/1945 | Nevin .................... 244/102 R |
| 2,406,710 A * | 8/1946 | Ramey et al. ........... 244/102 R |
| 2,457,625 A * | 12/1948 | Amiot .................... 244/129.5 |
| 2,670,156 A * | 2/1954 | Clark et al. .................... 244/63 |
| 2,731,221 A * | 1/1956 | Holton .................... 244/129.5 |
| 3,174,712 A * | 3/1965 | Ricard .................... 244/129.5 |
| 3,424,411 A * | 1/1969 | Blunschi, Sr. et al. ... 244/137.1 |
| 3,718,171 A * | 2/1973 | Godwin ...................... 160/210 |
| 4,412,665 A * | 11/1983 | Kramer et al. .......... 244/102 R |
| 4,674,712 A * | 6/1987 | Whitener et al. ........... 244/119 |
| 5,000,400 A * | 3/1991 | Stuhr .................... 244/102 R |
| 5,213,286 A * | 5/1993 | Elliott et al. ............. 244/129.4 |
| 5,947,417 A * | 9/1999 | Cameron ................. 244/129.5 |
| 6,068,215 A * | 5/2000 | Gruensfelder et al. ... 244/129.5 |
| 6,345,786 B1* | 2/2002 | Sakurai .................. 244/102 R |
| 6,352,221 B1* | 3/2002 | Sakurai .................. 244/102 R |
| 2005/0103937 A1* | 5/2005 | Briancourt ............... 244/129.5 |
| 2005/0194496 A1* | 9/2005 | White ...................... 244/129.4 |

FOREIGN PATENT DOCUMENTS

EP   1 129 938 A1   9/2001
WO   WO 01/56878 A1   8/2001

* cited by examiner

*Primary Examiner*—Teri Pham Luu
*Assistant Examiner*—Joshua Michener
(74) *Attorney, Agent, or Firm*—Oblon, Spivak, McClelland, Maier & Neustadt, P.C.

(57) ABSTRACT

The door comprises a panel (14) formed from two rigid parts (14a, 14b) hinged to each other edge to edge. A first part (14a) of these two parts is connected to the aircraft structure through a pivot pin (20) and a control means (22) is inserted between this first part (14a) and the structure. A kinematic control mechanism (16) connects the two parts (14a, 14b) to the aircraft structure, so as to enable progressive and controlled folding of these parts when opening the door. Thus the landing gear door can be opened and closed without any risk of it coming into contact with the wheels when the landing gear is extended.

17 Claims, 3 Drawing Sheets

HINGED DOOR FOR AIRCRAFT LANDING GEAR

TECHNICAL DOMAIN

The invention relates to an aircraft landing gear door.

The door according to the invention may be used to close a landing gear compartment that contains landing gear on any type of aircraft, particularly when the landing gear is located under the aircraft fuselage.

STATE OF THE ART

A landing gear door is typically formed by a one-piece rigid panel hinged onto the aircraft structure by a pivot pin offset towards the inside of the landing gear compartment with respect to the said panel. There is a jack inserted between the panel and the structure, inside the landing gear compartment to control pivoting of the panel towards the outside of the fuselage when the landing gear is being extended.

The pivot pin is located inside the landing gear compartment due to the fact that in practice, it is impossible to place hinges directly onto the fuselage, particularly to maintain aerodynamic continuity of the fuselage.

For safety reasons related to risks of tires bursting, it is desirable that a landing gear door can be opened and closed without coming into contact with the wheels when the landing gear is extended.

Existing doors with pivoting one-piece panels cannot solve this problem, because the end of the panel interferes with the wheels during its opening and closing movements when the landing gear is extended.

PRESENTATION OF THE INVENTION

The main purpose of the invention is a door for an aircraft landing gear, with an innovative design such that it does not come into contact with the wheels during opening and closing movements when the landing gear is extended.

According to the invention, this objective is achieved by means of an aircraft landing gear door comprising a panel capable of pivoting about a pivot pin on an aircraft structure, and means of controlling pivoting, inserted between the panel and the structure in which the panel is formed from at least two rigid parts hinged to each other about a hinge pin approximately parallel to the pivot pin, dynamic control means being provided to enable progressive and controlled folding of rigid parts about the said hinge pin when the control means are actuated to open the door, and conversely, in which the control means are inserted between the aircraft structure and a first of the rigid parts connected to the said structure through the pivot pin, characterised in that a thrust plate is hinged to the inside of the second rigid part, close to one of its edges opposite to and parallel to the hinge pin, the thrust plate being connected to the dynamic control means so as to automatically open the door when a predetermined downwards force is applied to the thrust plate.

This arrangement provides a means of progressively reducing the space occupied by the panel in a controlled manner as the door opens, particularly the space occupied in the vertical direction, and vice versa. This prevents the panel from touching a landing gear wheel when the landing gear is already extended. This arrangement also enables the door to open by gravity so that the landing gear can extend when the control means are inoperative. In this case, the door is not required to close again by itself.

In one preferred embodiment of the invention, the dynamic control means include two door panel rods each hinged onto one of the rigid parts at one of their ends and a main connecting rod hinged between the other ends of the door panel rods and the aircraft structure.

This arrangement provides a means of automatically opening the door by gravity if there is a failure in the control means, by placing the thrust plate under a wheel of the landing gear and setting the predetermined force equal to not more than the mass of the landing gear when the aircraft is close to the ground.

In this improvement, the thrust plate is advantageously connected through at least one auxiliary connecting rod to the ends of the door panel rods hinged onto the main connecting rod.

BRIEF DESCRIPTION OF THE DRAWINGS

We will now describe different embodiments of the invention as illustrative examples that are in no way limitative, with reference to the attached drawings in which.

DETAILED DESCRIPTION OF PREFERRED EMBODIMENTS OF THE INVENTION

Figure 1A:
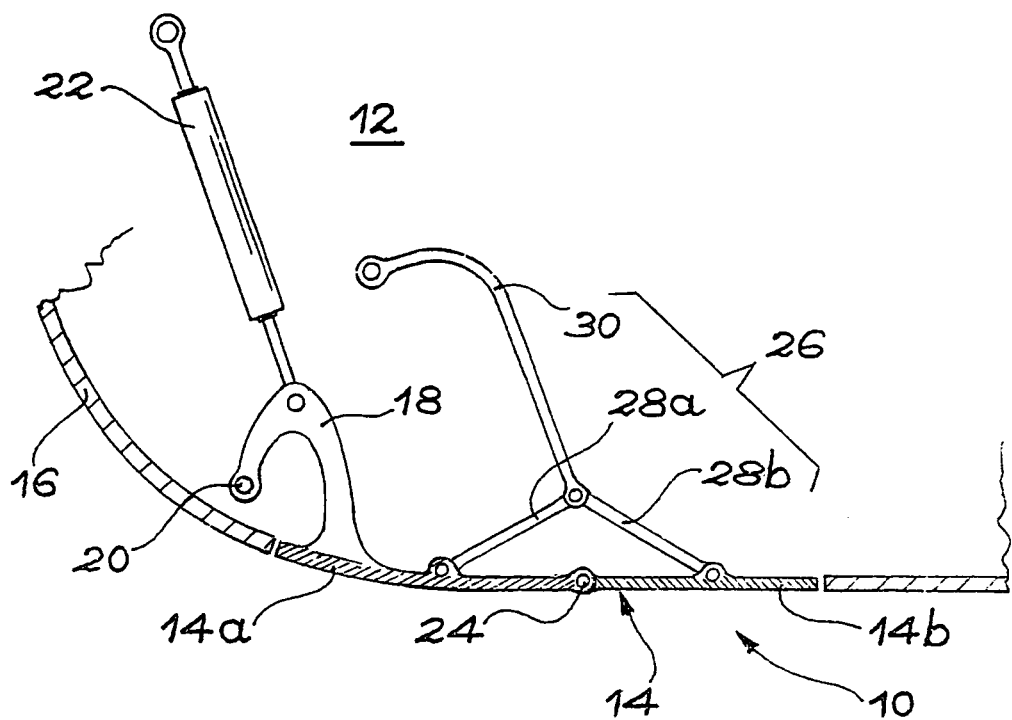
FIGS. 1A and 1B are diagrammatic sectional views showing a landing gear door according to a first embodiment of the invention, in the closed position and the open position respectively.
Figure 1B:
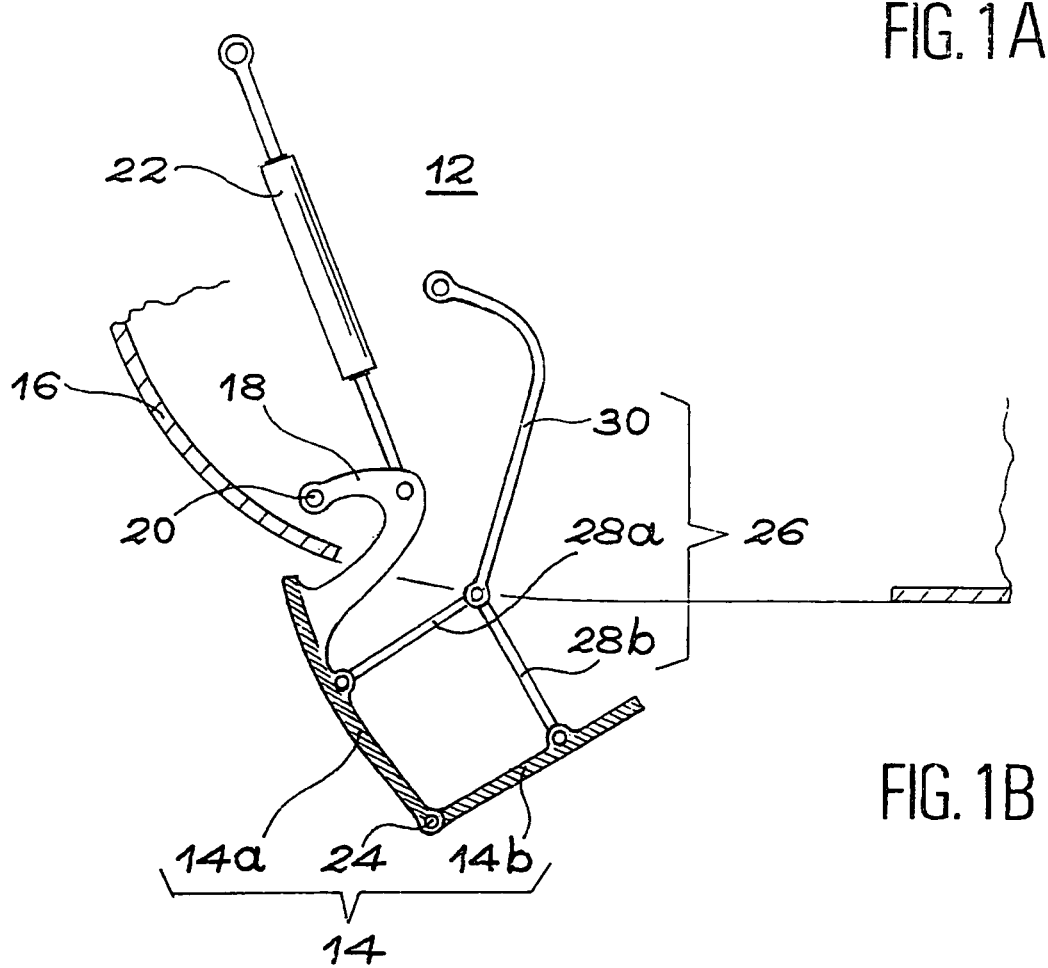

As shown very diagrammatically in FIGS. 1A and 1B, the invention relates to an aircraft landing gear door 10. Such a door 10 is designed to close off a landing gear compartment 12 in which the landing gear is stored when the landing gear is retracted.

The door 10 comprises a panel 14 with a shape complementary to the shape of an opening formed in the part 16 of the outer skin of the aircraft in which the landing gear associated with the said door is located. This part 16 of the outer skin of the aircraft is usually a fuselage or wing element.

The panel 14 is supported by the aircraft structure inside the landing gear compartment 12, through rigid arms 18 fixed to the panel 14 and capable of pivoting on the said structure about a pivot pin 20. This pivot pin is usually arranged in a direction approximately parallel to the longitudinal axis of the aircraft and is located on the outside of the door from the said longitudinal axis.

Pivot control means, usually consisting of a jack 22, are inserted between the panel 14 and the aircraft structure, inside the landing gear compartment 12. More precisely, the ends of the jack are connected to the rigid arms 18 and to the said structure, by pivots.

This arrangement enables the door to pass from a closed state shown in FIG. 1A to an open state shown in FIG. 1B, when the control means are actuated.

When the door 10 is in its closed state, it provides aerodynamic continuity of the outer skin of the aircraft in the area concerned.

According to the invention, the panel 14 is formed from two rigid parts 14a and 14b hinged to each other edge to edge about a hinge pin 24. This hinge pin 24 is in a direction approximately parallel to the pivot pin 20.

The arms 18 are fixed to the first part 14a of the panel 14 such that this first part 14a pivots directly about the pivot pin 20 when the control means are actuated. The hinge pin 24 connects the second part 14b of the panel 14 to the edge of the first part 14a furthest from the pivot pin 20.

Furthermore, the door 10 comprises dynamic control means 26 designed to control the dynamics of the second part 14b of the panel 14 when the control means are actuated. More precisely, the dynamic control means 26 are designed to provide controlled progressive folding of the rigid parts 14a and 14b about the hinge pin 24 when the control means are actuated so as to open the door, and vice versa. This action of the dynamic control means 26 can be more easily understood by comparing FIGS. 1A and 1B.

In practice, the kinematic control means 26 are composed of a mechanism that connects each of the rigid parts 14a and 14b to each other and to the aircraft structure, inside the landing gear compartment 12.

In the embodiment shown in FIGS. 1A and 1B, this mechanism comprises at least two door panel rods 28a and 28b and at least one main connecting rod 30. One end of door panel rod 28a is hinged to the first part 14a of panel 14, one end of the door panel rod 28b is hinged to the second part 14b of the panel 14 and one end of the main connecting rod 30 is hinged to the aircraft structure. Finally, the other ends of door panel rods 28a and 28b and the main connecting rod 30 are hinged together.

In the embodiment shown in FIGS. 1A and 1B, the two parts 14a and 14b of the panel 14 are approximately the same width. However, their width may be slightly different, without going outside the scope of the invention.

Note also that the panel 14 may be formed from more than two rigid parts hinged together without going outside the scope of the invention. In this case, the dynamic control means 26 are modified so as to enable progressive controlled folding of each part of the panel.

When the door 10 is closed as shown in FIG. 1A, the different parts 14a, 14b of the panel 14 are aligned with each other and with the adjacent part 16 of the outer skin of the aircraft.

When the jack 22 is actuated so as to open the door 10, the first part 14a of the panel 14 is pivoted towards the outside of the aircraft, about the pivot hinge 20.

Simultaneously, the dynamic control means 26 pull the second part 14b of the door 14 towards the inside of the aircraft, because the main connecting rod 30 is hinged to the aircraft structure directly and its length is invariable, and the length of the door panel rods 28a and 28b is also invariable. Consequently, the second part 14b of the panel 14 progressively folds inwards in a controlled manner towards the inside of the landing gear compartment 12, rotating about the hinge pin 24, as shown in FIG. 1B.

Due to the arrangement that has just been described, the space necessary for movement of the door 10 according to the invention is smaller than in the case of a one-piece door according to prior art. In particular, the dimension of the door in the vertical direction is reduced by approximately half when the door is open, in the case in which the two parts 14a and 14b have the same width.

Figure 2A:
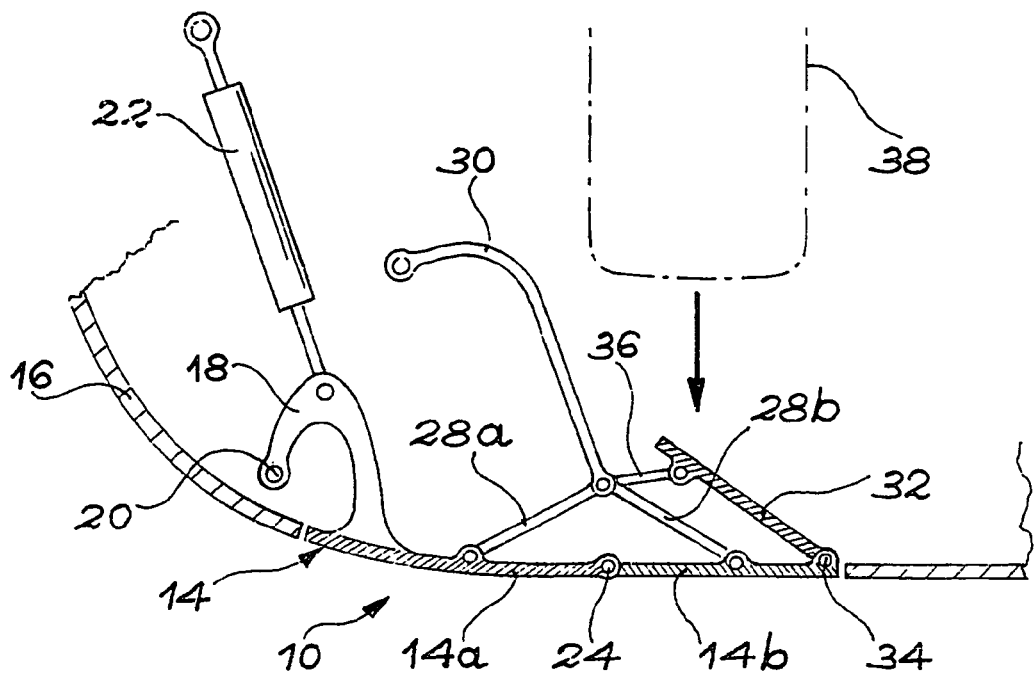
FIGS. 2A and 2B are diagrammatic sectional views showing a landing gear door according to a second embodiment of the invention, in the closed position and in the open position respectively.
Figure 2B:
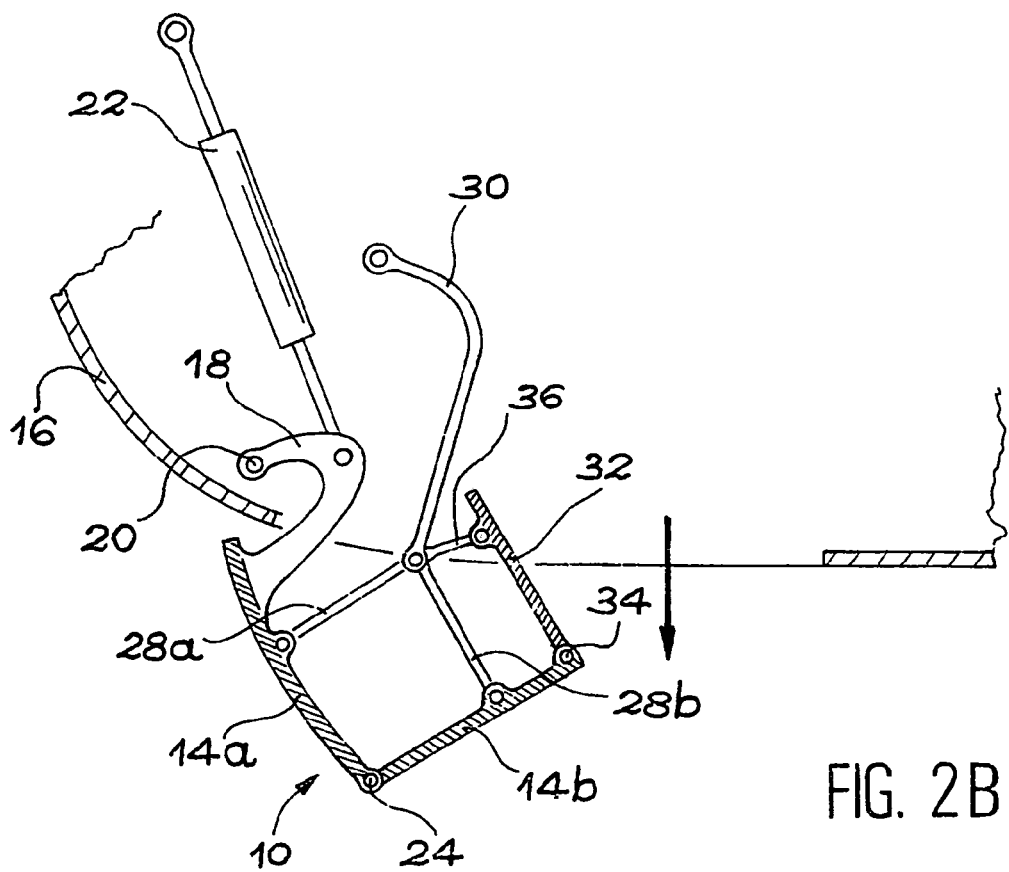
Figure 3:
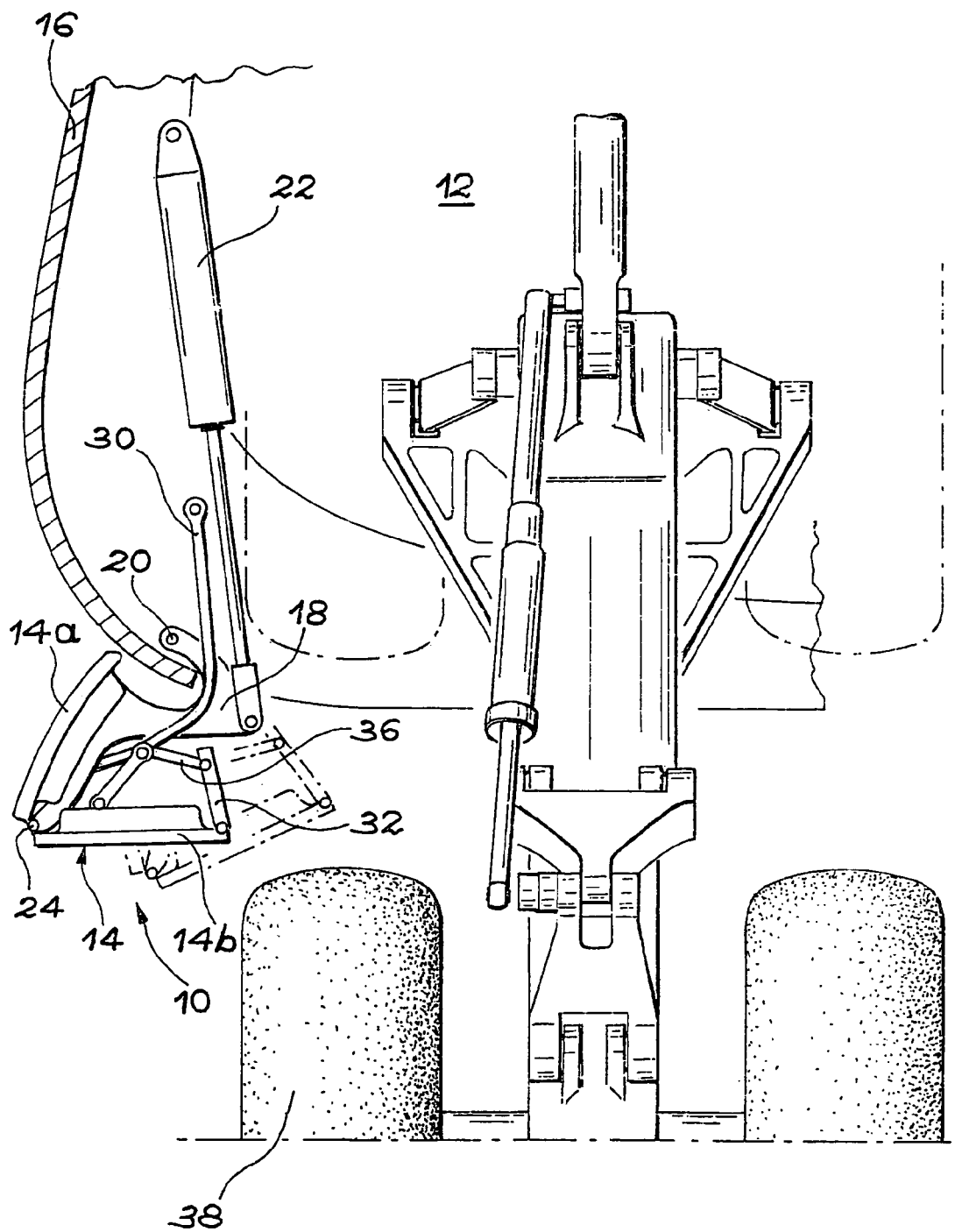
FIG. 3 shows a sectional view showing the door in FIGS. 2A and 2B in more detail, in the open position.

FIGS. 2A, 2B and 3 show a second embodiment of the invention. This second embodiment is an improvement to the first embodiment, although all elements are identical in each embodiment. Only elements specific to this improvement will be described below, in order to simplify the description.

A rigid thrust plate 32 is hinged, through a hinge pin 34, to the inside of the second part 14b of the panel 14. More precisely, the pin 34 connects one edge of the thrust plate 32 to the second part 14b close to the edge of this part opposite the hinge pin 24.

The edge of the thrust plate 32 opposite the pin 34 is connected to the dynamic control means 26 by at least one auxiliary rod 36. More precisely, one end of the auxiliary rod 36 is hinged to the ends through which the main connecting rod 30 and the door panel rods 28a and 28b are hinged to each other.

As shown in FIG. 2A, the arrangement that has just been described is such that, when the door 10 is closed, the thrust plate 32 is located above the second part 14b of the panel 14 and is inclined downwards in the direction towards the pin 34. More precisely, the angle of inclination of the thrust plate 32 with respect to the horizontal is then between about 30° and about 45°.

Furthermore, and as shown in chained dotted lines in FIG. 3, the thrust plate is then located below one or several of the wheels 38 of the landing gear.

Under these conditions, if the control jack 22 is inoperative when the landing gear needs to be extended, the mass of the landing gear when the aircraft is close to the ground applies a downwards force onto the thrust plate 32, sufficient to open the door automatically as shown in FIGS. 2B and 3. The arrangement shown in these Figures is such that the door opens automatically when a predetermined force equal to not more than the above-mentioned mass is applied downwards onto the thrust plate 32.

Thus, the improvement shown in FIGS. 2A, 2B and 3 guarantees that the door 10 can open automatically and therefore the landing gear can be extended automatically by gravity when the control means of the said door are inoperative.

The invention claimed is:

1. An aircraft landing gear door for a landing gear compartment, said door comprising:
   a panel, capable of pivoting about a pivot pin on an aircraft structure,
   means of controlling pivoting, inserted between the panel and the aircraft structure,
   wherein the panel is formed from at least two rigid parts hinged to each other about a hinge pin approximately parallel to the pivot pin,
   control means to enable progressive and controlled folding of said rigid parts about said hinge pin, when the control means are actuated to open the door, wherein the control means to enable progressive and controlled folding of said rigid parts are inserted between the aircraft structure and a first part of the rigid parts, connected to said structure through the pivot pin, and
   a thrust plate hinged to an inside of one of said rigid parts, close to one of its edges opposite to and parallel to the hinge pin, said thrust plate being connected to the control means so as to automatically open the door when a predetermined downwards force is applied to the thrust plate,
   wherein, when said door is closed, said thrust plate is located above said one of said rigid parts so that both sides of said thrust plate are inside said landing gear compartment when said door is closed.

2. An aircraft landing gear door according to claim 1, wherein the control means include two door panel rods each hinged onto one of the rigid parts at one of their ends and a main connecting rod hinged between the other ends of the door panel rods and the aircraft structure.

3. An aircraft landing gear door according to claim 2, wherein the thrust plate is connected to the other ends of the door panel rods through at least one auxiliary rod.

4. An aircraft landing gear door according to claim 1, wherein the thrust plate is located below one wheel of the landing gear and said predetermined force is equal to not more than the mass of said landing gear when the aircraft is close to the ground.

5. An aircraft landing gear door for a landing gear compartment housing a landing gear, comprising:
- a panel comprising a first part and a second part, said first and second parts being configured to pivot with respect to each other;
- a panel activator configured to move said panel from a closed position to an open position and from said open position to said closed position;
- a linkage comprising a first door panel rod, a second door panel rod, and a connecting rod; and
- a thrust plate that is not aligned with said first and second parts in said closed position,
- wherein said first door panel rod is hinged onto said first part of said panel, said second door panel rod is hinged onto said second part of said panel, and said first door panel rod, said second door panel rod, and said connecting rod are hinged together,
- wherein said first and second parts of said panel are aligned in said closed position so as to provide aerodynamic continuity of an outer aircraft skin, and
- wherein, in said closed position, said thrust plate is located above the second part of said panel so that both sides of said thrust plate are inside said landing gear compartment in said closed position.

6. An aircraft landing gear door according to claim 5, wherein said first and second parts of said panel are dimensioned so as to close said landing gear compartment in said closed position.

7. An aircraft landing gear door according to claim 6, wherein said panel is movable between said open and closed positions without contacting wheels on said landing gear when said landing gear is extended.

8. An aircraft landing gear door according to claim 5, wherein said first and second door panel rods are invariable in length.

9. An aircraft landing gear door according to claim 5, wherein said panel activator comprises a jack inside said landing gear compartment and coupled to said panel.

10. An aircraft landing gear door according to claim 9, wherein said panel activator further comprises a pivotable arm coupled to said jack, to said panel and to a pivot pin.

11. An aircraft landing gear door according to claim 10, wherein said first and second parts of said panel are coupled to each other via a hinge pin that is approximately parallel to said pivot pin.

12. An aircraft landing gear door according to claim 5, wherein said thrust plate is hinged to said second part of said panel.

13. An aircraft landing gear door according to claim 12, wherein said thrust plate is directly hinged to said second part.

14. An aircraft landing gear door according to claim 5, wherein said thrust plate is connected to said linkage so as to automatically open the panel when a predetermined downwards force is applied to the thrust plate.

15. An aircraft landing gear door according to claim 5, wherein said thrust plate is inclined with respect to said second part in said closed position at an angle between about 30° and 45°.

16. An aircraft landing gear door for a landing gear compartment housing a landing gear, comprising:
- a panel pivotable about a pivot pin on an aircraft structure, said panel including at least two rigid parts hinged to each other about a hinge pin approximately parallel to the pivot pin;
- a pivot actuator between the panel and the aircraft structure, said pivot actuator being configured to pivot said panel from an open position to a closed position;
- a linkage configured to fold said at least two rigid parts about said hinge pin when the pivot actuator pivots said panel from said closed position to said open position; and
- a thrust plate hinged to one of said at least two rigid parts, said thrust plate being connected to the linkage so as to pivot said panel from said closed position to said open position when a predetermined downwards force is applied to the thrust plate,
- wherein, in said closed position, said thrust plate is located above said one of said at least two rigid parts so that both sides of said thrust plate are inside said landing gear compartment in said closed position.

17. An aircraft landing gear door according to claim 16, wherein said panel is movable between said open and closed positions without contacting wheels on said landing gear when said landing gear is extended.

* * * * *